(12) United States Patent
Sakamoto et al.

(10) Patent No.: US 7,821,546 B2
(45) Date of Patent: Oct. 26, 2010

(54) IMAGE PROCESSING APPARATUS, IMAGING APPARATUS, IMAGE PROCESSING METHOD, AND PROGRAM

(75) Inventors: Shohei Sakamoto, Fussa (JP); Jun Muraki, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 1029 days.

(21) Appl. No.: 11/591,071

(22) Filed: Nov. 1, 2006

(65) Prior Publication Data

US 2007/0115370 A1    May 24, 2007

(30) Foreign Application Priority Data

Nov. 18, 2005  (JP)  ............................. 2005-334441

(51) Int. Cl.
  *H04N 5/217*  (2006.01)
(52) U.S. Cl. .................... 348/222.1; 348/241; 382/167; 358/520
(58) Field of Classification Search ........................ None
  See application file for complete search history.

(56) References Cited

U.S. PATENT DOCUMENTS

| | | | | |
|---|---|---|---|---|
| 5,489,998 | A * | 2/1996 | Yamada et al. ............... | 358/523 |
| 6,404,509 | B1 * | 6/2002 | Kuwata et al. ............... | 358/1.9 |
| 2003/0174222 | A1 * | 9/2003 | Uchida ........................ | 348/241 |
| 2003/0193579 | A1 * | 10/2003 | Mori et al. ................ | 348/222.1 |

FOREIGN PATENT DOCUMENTS

| | | |
|---|---|---|
| JP | 2002-16818 A | 1/2002 |
| JP | 2003-348614 A | 12/2003 |
| JP | 2004-228675 A | 8/2004 |
| JP | 2004-320675 A | 11/2004 |
| JP | 2005-080313 A | 3/2005 |
| JP | 2005-122612 A | 5/2005 |
| JP | 2005-198343 A | 7/2005 |

OTHER PUBLICATIONS

Japanese Office Action dated Jun. 16, 2009 and English translation thereof issued in a counterpart Japanese Application No. 2005-33444.

* cited by examiner

*Primary Examiner*—David L Ometz
*Assistant Examiner*—Angel L Garces-Rivera
(74) *Attorney, Agent, or Firm*—Holtz, Holtz, Goodman & Chick, PC

(57) ABSTRACT

The present invention includes a coordinate rotating circuit which executes a coordinate rotating conversion based on a predetermined rotation matrix, on each of two color difference signals to obtain two color difference rotated signals, a normalizing circuit which divides the color difference rotated signal by a luminance signal to obtain a color difference normalized signal, a subtractor and an absolute value calculating circuit which calculate a color saturation degree-of-deviation signal from a difference between the color difference normalized signal and a coefficient, and a tangent circuit and an absolute value calculating circuit which divide the color difference rotated signal by the color difference rotated signal to calculate a hue degree-of-deviation signal from a resulting quotient.

19 Claims, 4 Drawing Sheets

IMAGE PROCESSING APPARATUS, IMAGING APPARATUS, IMAGE PROCESSING METHOD, AND PROGRAM

CROSS-REFERENCE TO RELATED APPLICATIONS

This application is based upon and claims the benefit of priority from prior Japanese Patent Application No. 2005-334441, filed Nov. 18, 2005, the entire contents of which are incorporated herein by reference.

BACKGROUND OF THE INVENTION

1. Field of the Invention

The present invention relates to an image processing apparatus, an imaging apparatus, an image processing method, and a program which are preferably used, for example, to take a portrait with a digital camera.

2. Description of the Related Art

Means for detecting a flesh color is required to execute image processing such that noise in the flesh color part of an image is reduced to make a face in the image appear smoother. One possible method is, for example, a technique for inputting color difference (U and V) components of a luminance-color difference (YUV) signal constituting an image signal, to a prepared two-dimensional look-up table(LUT), and depending on whether an output from the LUT falls within the range from a minimum to maximum value determined by the luminance (Y) signal, determining whether or not the signal corresponds to a color (flesh color or the like) in a particular gamut (see, for example, Japanese Patent No. 3366357).

BRIEF SUMMARY OF THE INVENTION

An image processing apparatus according to a preferred aspect of the present invention is characterized by comprising:

a degree-of-deviation deriving unit which derives, for each predetermined unit area, a degree of deviation of a color of the unit area from a specific color corresponding to a predetermined characteristic amount of a subject; and a correcting unit which corrects a color for each predetermined unit area on the basis of a correction value corresponding to the degree of deviation derived by the degree-of-deviation deriving unit.

An imaging apparatus according to a preferred aspect of the present invention is characterized by comprising:

an image taking unit which takes an image of a subject to obtain an image signal for a luminance-color difference system;

a rotational converting unit which executes a coordinate rotating conversion based on a predetermined rotation matrix, on each of two color difference signals in the image signal obtained by the image taking unit;

a normalizing unit which divides one of the color difference rotated signals obtained by the rotational converting unit by a luminance signal in the image signal to normalize the color difference rotated signal to obtain a color difference normalized signal;

a color saturation degree-of-deviation calculating unit which calculates a color saturation degree-of-deviation signal from a difference between the color difference normalized signal obtained by the normalizing unit and a predetermined coefficient;

a hue degree-of-deviation calculating unit which divides the other of the color difference rotated signals obtained by the rotational converting unit by the one of the color difference rotated signals to calculate a hue degree-of-deviation signal from a resulting quotient;

an image processing unit which executes image processing on the image signal using at least one of the color saturation degree-of-deviation signal and hue degree-of-deviation signal; and a recording unit which records an image signal obtained by the image processing unit.

An imaging method according to a preferred aspect of the present invention is characterized by comprising:

a rotational converting step of executing a coordinate rotating conversion based on a predetermined rotation matrix, on each of two color difference signals in an image signal for a luminance-color difference system;

a normalizing step of dividing one of the color difference rotated signals obtained in the rotational converting step by a luminance signal in the image signal to normalize the color difference rotated signal to obtain a color difference normalized signal;

a color saturation degree-of-deviation calculating step of calculating a color saturation degree-of-deviation signal from a difference between the color difference normalized signal obtained in the normalizing step and a predetermined coefficient; and a hue degree-of-deviation calculating step of dividing the other of the color difference rotated signals obtained in the rotational converting step by the one of the color difference rotated signals to calculate a hue degree-of-deviation signal from a resulting quotient.

A program according to a preferred aspect of the present invention is characterized by allowing a computer to execute:

a rotational converting step of executing a coordinate rotating conversion based on a predetermined rotation matrix, on each of two color difference signals an image signal for a luminance-color difference system;

a normalizing step of dividing one of the color difference rotated signals obtained in the rotational converting step by a luminance signal in the image signal to normalize the color difference rotated signal to obtain a color difference normalized signal;

a color saturation degree-of-deviation calculating step of calculating a color saturation degree-of-deviation signal from a difference between the color difference normalized signal obtained in the normalizing step and a predetermined coefficient; and a hue degree-of-deviation calculating step of dividing the other of the color difference rotated signals obtained in the rotational converting step by the one of the color difference rotated signals to calculate a hue degree-of-deviation signal from a resulting quotient.

DETAILED DESCRIPTION OF THE INVENTION

With reference to the drawings, description will be given of an embodiment in which the present invention is applied to a digital camera.

Figure 1:
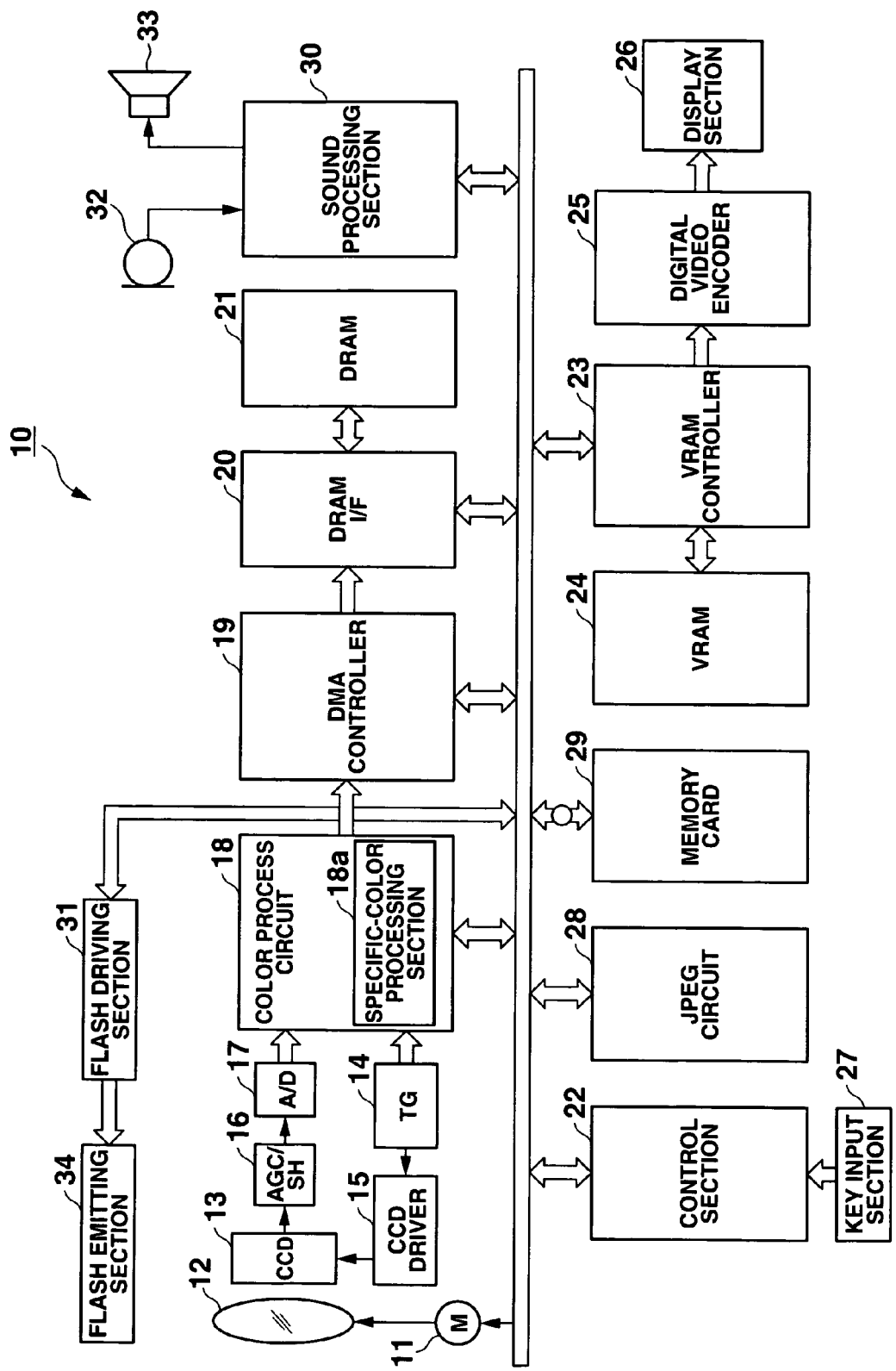
FIG. 1 is a block diagram showing the configuration of a functional circuit in a digital camera according to an embodiment of the present invention.

FIG. 1 shows the conceptual configuration of an electronic circuit in a digital camera 10.

With reference to FIG. 1, in a monitoring state in an image taking mode, the positions of some of the lenses in an image taking optical system 12, specifically, a zoom lens and a focus lens, are appropriately drivingly moved by a motor (M) 11. CCD 13, a solid imaging element, is placed at an image forming position behind the image taking optical axis of the image taking lens optical system 12 via a mechanical shutter (not shown).

CCD 13 is drivingly scanned by a timing generator (TG) 14 and a CCD driver 15 to output photoelectric conversion outputs for one screen, the outputs corresponding to optical images formed every period.

The photoelectric output in the form of an analog value signal has its gain automatically adjusted by an automatic gain control/sample-and-hold (AGC/SH) circuit 16 depending on an ISO sensitivity currently set for each primary color component, that is, R, G, or B. The resulting photoelectric output is sampled and held and then sent to an analog-to-digital converter 17.

The analog-to-digital converter 17 converts analog image data into digital data and outputs the digital data to a color process circuit 18.

The color process circuit 18 executes color processing including a pixel interpolating process and a γ correcting process on digital pixel data to generate a luminance signal Y and color difference signals Cb and Cr with digital values. A specific-color color processing section 18a described below then executes an appropriate contour emphasizing process on each pixel and outputs the resulting signals to a direct memory access (DMA) controller 19.

The DMA controller 19 writes the luminance signal Y and color difference signals Cb and Cr output by the color process circuit 18, to a buffer inside the DMA controller 19, using a composite synchronizing signal, a memory write enable signal, and a clock signal also output by the color process circuit 18. The DMA controller 19 thus DMA transfers the signals via a DRAM interface (I/F) 20 to DRAM 21 that is used as a buffer memory.

A control section 22 is composed of CPU, a nonvolatile memory in which a program for operations including flashing and sensitivity increasing for image taking described below is fixedly stored, RAM that is used as a work memory, and the like. The control section 22 controls the whole digital camera. After the DMA transfer of the luminance and color difference signals to DRAM 21, the control section 22 reads the luminance and color difference signals from DRAM 21 via the DRAM interface 20 and writes them to VRAM 24 via a VRAM controller 23.

A digital video encoder 25 periodically reads the luminance and color difference signals from VRAM 24 via the VRAM controller 23. On the basis of these data, the digital video encoder 25 generates and outputs a video signal to a display section 26.

The display section 26 is composed of, for example, a color liquid crystal panel with a backlight which is disposed on a rear surface of housing of the digital camera 10, and a driving circuit for the color liquid crystal panel. In an image taking mode, the display section 26 functions as an electronic finder to provide a display based on the video signal from the digital video encoder 25. The display section 26 thus monitor displays an image in real time which is based on the image information currently loaded from the digital video encoder 25. In a reproduction mode, the display section 26 reproduces and displays a selected image or the like.

In what is called a through image display state in which the current image is displayed on the display section 26 in real time as a monitor image, a trigger signal is generated by operating a shutter key constituting a key input section 27 at a timing for still image taking.

The control section 22 stops DMA transferring, to DRAM 21, the luminance and color difference signals for one screen currently loaded from CCD 13 in response to the trigger signal. The control section 22 then re-drives the mechanical shutter (not shown) and CCD 13 at a shutter speed that meets appropriate exposure conditions. The control section 22 thus obtains and transfers a luminance and color difference signals for one screen to DRAM 21. The control section 22 subsequently stops this path and changes to a storage state.

In the storage state, the control section 22 reads the luminance and color difference signals for one frame written to DRAM 21, via the DRAM interface 20 for each component Y, U, or V; in this case, the control section 22 uses a unit called a basic block of 8×8 pixels. The control section 22 then writes the signals to a Joint Photographic Experts Group (JPEG) circuit 28, which then executes encoding by a data compressing process such as adaptive discrete cosine transform (ADCT) or Huffman coding that is an entropy encoding scheme.

The control section 22 then reads the resulting code data from the JPEG circuit 28 in the form of a data file for one image. The control section 22 then writes the data to a memory card 29 releasably installed in the digital camera 10.

Upon the completion of process of compressing the luminance and color difference signals for one frame and writing all the compressed data to the memory card 29, the control section 22 re-activates the path from CCD 13 to DRAM 21.

The above key input section 27, a sound processing section 30, and a flash driving section 31 are connected to the control section 22.

The key input section 27 is composed of, in addition to the above shutter key, a power supply key, a zoom key, an image taking mode key, a reproduction mode key, a cursor key, a set key, a menu key, a macro key, a flash key, and the like. Signals resulting from key operations are transmitted directly to the control section 22.

The sound processing section 30 comprises a sound source circuit such as a PCM sound source. To record sound, the sound processing section 30 digitalizes sound signals input through a microphone section (MIC) 32 disposed on a front surface of housing of the digital camera 10. The sound processing section 30 executes data compression in accordance with a predetermined file format, for example, Moving Picture Experts Group-1 Audio Layer 3 (MP3) standards to create and transmit a sound data file to the memory card 29. On the other hand, to reproduce sounds, the sound processing section 30 decompresses the sound data file read from the memory card 29 to obtain analog data. The sound processing section 30 then drives a speaker section (SP) 33 provided closer to a rear surface of the digital camera 10 similarly to the display section 26. The sound processing section 30 thus emits sounds.

The flash driving section 31 charges a flashing mass capacitor (not shown) during still image taking and flash drives a flash emitting section 34 composed of a xenon discharge tube, under the control of the control section 22.

In the image taking mode, if motion picture taking is selected instead of still image taking, the first operation of the shutter key causes a series of operations to be started; the series of operations include acquiring the above still image data, compressing the data using the JPEG circuit 28, and storing it in the memory card 29 and are consecutively performed at an appropriate frame rate, for example, 30 frames/second. The second operation of the shutter key or the elapse of a predetermined limit time, for example, 30 seconds, causes the series of still image data files to be collectively reformatted into a motion JPEG data file (AVI file).

In the reproduction mode, the control section 22 selectively reads the image data stored in the memory card 29. The control section 22 then decompresses the compressed image data by a procedure exactly opposite to that of data compression executed by the JPEG circuit 28 in the image taking mode. The control section 22 allows the DRAM interface 20 to hold the decompressed data in DRAM 21 and allows the VRAM controller 23 to store the contents held in DRAM 21, in VRAM 24. The control section 22 periodically reads the image data from VRAM 24 to generate video signals and allows the display section 26 to reproduce the signals.

If the selected image data is motion picture instead of a still image, the control section 22 temporally continuously reproduces individual still image data constituting the selected motion picture file at a predetermined frame rate. Once the final still image is completely reproduced, the control section 22 continues to reproduce and display the leading still image data until the next reproduction instruction is given.

Figure 2:
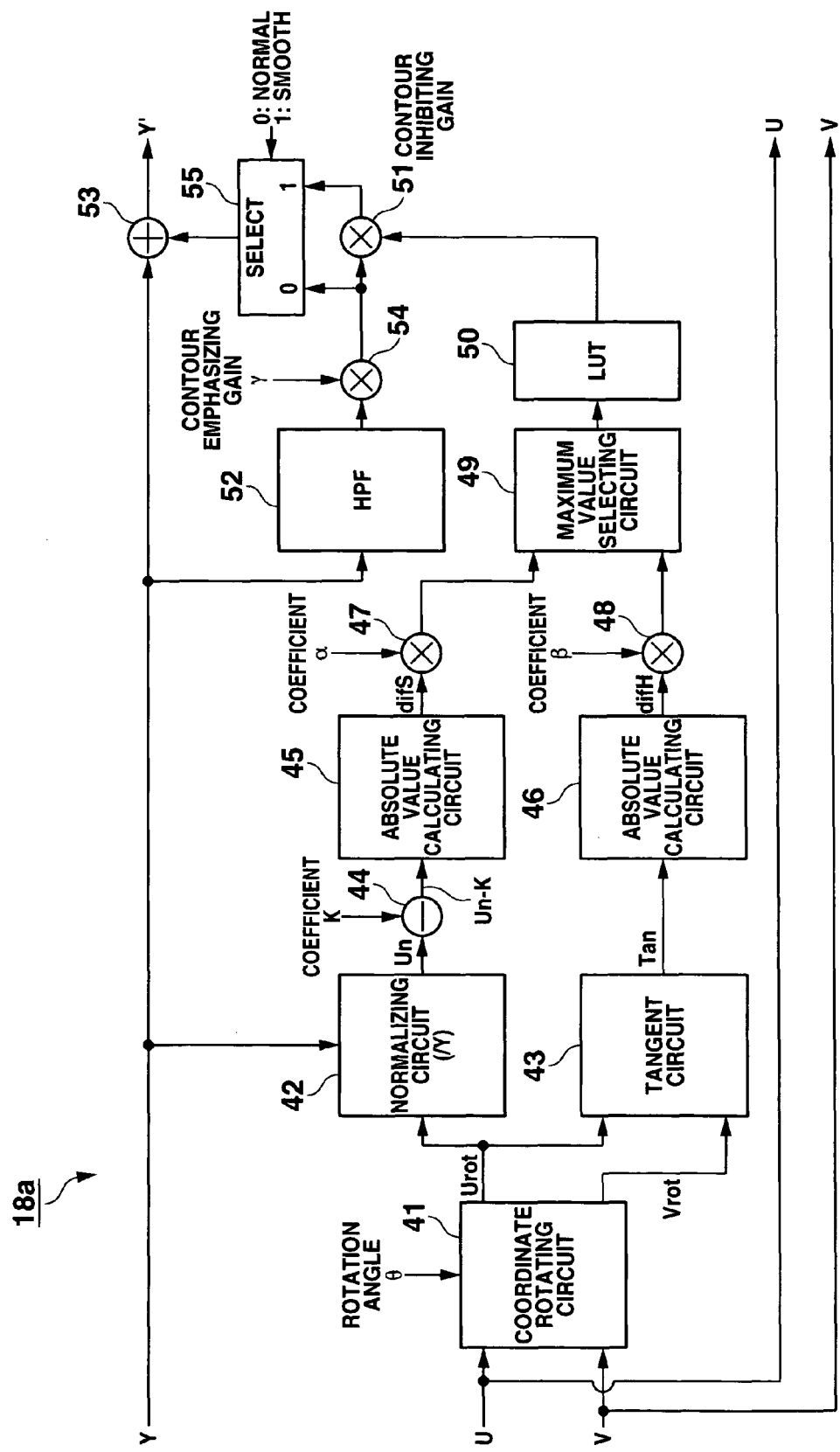
FIG. 2 is a block diagram showing the detailed configuration of a functional circuit in a specific-color processing section in a color process circuit in FIG. 1 according to the embodiment.

Now, with reference to FIG. 2, a detailed description will be given of circuit configuration of the specific-color processing section 18a, provided in the color process circuit 18. In FIG. 2, two color difference signals U and V with digital values are output as they are input to a coordinate rotating circuit 41; the color difference signals U and V are contained in an image signal for a luminance-color difference system which constitutes one pixel.

The coordinate rotating circuit 41 performs a rotation matrix operation using a preset rotation angle θ as a coefficient, to obtain color difference rotated signals Urot and Vrot. The coordinate rotating circuit 41 then outputs the resulting color difference rotated signal Urot to a normalizing circuit 42 and a tangent circuit 43 and outputs the resulting color difference rotated signal Vrot only to the tangent circuit 43.

The normalizing circuit 42 divides the input color difference rotated signal Urot by a corresponding luminance signal Y to eliminate the effects of exposure from the color difference rotated signal Urot. The normalizing circuit 42 thus outputs a color difference normalized signal Un corresponding to a quotient.

A subtractor 44 then subtracts a coefficient K from the color difference normalized signal Un, with the difference "Un−K" input to an absolute value calculating circuit 45.

The absolute value calculating circuit 45 determines the absolute value of the input signal "Un−K" to obtain a chrome deviation signal difS.

On the other hand, the tangent circuit 43 divides the color difference rotated signal Vrot by the color difference rotated signal Urot to obtain a tangent signal Tan. The absolute value calculating circuit 46 converts the tangent signal Tan into an absolute value to obtain a hue deviation signal difH.

Gain is applied to the color saturation deviation signal difS and hue deviation signal difH using coefficients α and β determined by multipliers 47 and 48, respectively. The resulting signals are then sent to a maximum value selecting circuit 49.

The maximum value selecting circuit 49 selects and outputs the larger one of the two input deviation signals to the lookup table (LUT) 50.

The lookup table 50 fixedly stores contour inhibiting gain values each corresponding to the degree of deviation from a specific color corresponding to the characteristic amount of a subject. A gain value read in association with the input deviation signal is provided to a multiplier 51.

An output from a high-pass filter (HPF) 52 is input to a multiplier 54; the high-pass filter 52 extracts a predetermined high frequency region of space frequency components of the pixel position from a change between temporally continuously input digital value luminance signals Y for adjacent pixels. The multiplier 54 multiplies the output from the high-pass filter 52 by a predetermined coefficient γ and provides the product to a selection circuit 55 and the multiplier 51.

Further, a product resulting from multiplication by the multiplier 51 is provided to the selection circuit 55.

The selection circuit 55 selects and outputs one of the outputs from the multipliers 54 and 51 to an adder 53. The selection circuit 55 selects the output from the multiplier 51 if a smooth mode described below has been selected, and selects the output from the multiplier 54 if a mode other than the smooth mode described below has been selected.

The adder 53 adds the output selected by the selection circuit 55 and the luminance signal Y together, and outputs it, as a luminance signal Y'. In other words, the adder 53 appropriately emphasizes the high frequency component of the luminance signal Y by a contour emphasizing process and outputs it, as a luminance signal Y'.

However, the specific-color processing section 18a outputs the input color difference signals U and V as they are and outputs the luminance signal Y', obtained by executing the contour emphasizing process on the input luminance signal Y.

Now, the operation of the above embodiment will be described.

In the digital camera 10, like other common cameras, the shutter key has a two-level operation stroke. At a first level, the shutter key is depressed down to about half of a full stroke; this operation state is generally called halfway depression. An auto-focusing focusing (AF) process and an auto-exposure (AE) process are thus executed with the respective process values locked. At a second level, the shutter key is depressed through a full stroke; this operation state is generally called a full depression. Actual image taking based on the AF and AE values is thus executed. The digital camera 10 performs an image taking operation on the basis of the above operation logic.

With the digital camera 10, in the still image taking mode, a user can arbitrarily set scene program image taking called for example the "smooth mode". In the "smooth mode", a flesh color is detected in the image signal as a specific color. Contour emphasis is then inhibited at positions determined to have the flesh color to make the flesh color components of the image appear smoother.

Now, description will be given of operation of the specific-color processing section 18a of the color process circuit 18 in the image taking mode.

Both during through image display and during recording, the coordinate rotating circuit 41 executes a coordinate rotating conversion on both input color difference signals U(Cr) and V(Cb) using the rotation angle θ as a coefficient.

The rotation angle θ, used as a coefficient for a rotation matrix, is determined as follows.

Figure 3:
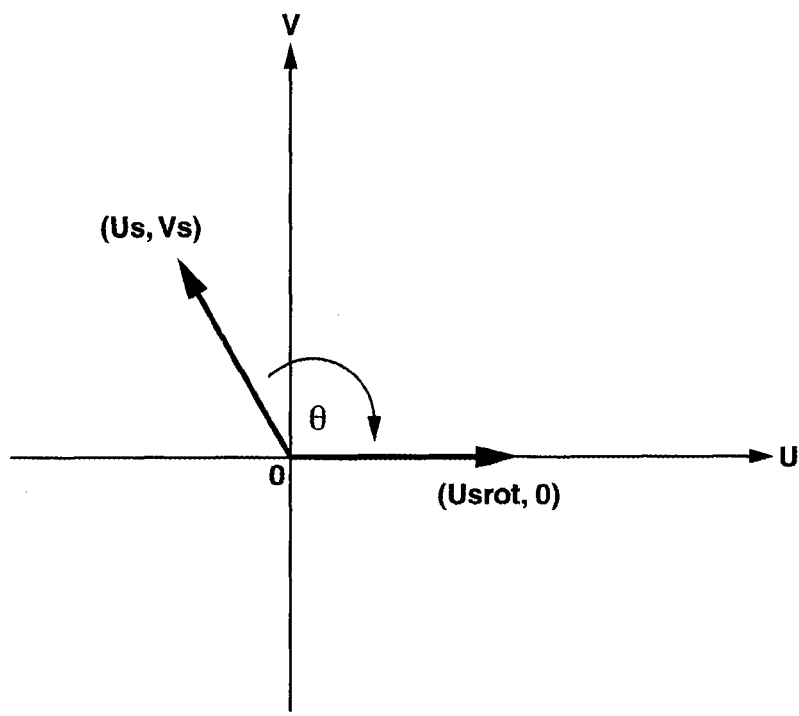
FIG. 3 is a diagram illustrating the concept of contents of processing executed by a coordinate converting circuit in FIG. 2 according to the embodiment.

As shown in FIG. 3, a specific color (in this case, the flesh color) is determined which is to be detected as the characteristic amount of the subject. Specifically, reference color difference signals are defined as Us and Vs. The signals are rotated around an origin on a two-dimensional plane formed of a U and V axes and converted into a matrix located on the U axis, where V=0.

A matrix that is rotated through the angle θ around the origin is expressed by:

$$R = \begin{pmatrix} \cos\theta & -\sin\theta \\ \sin\theta & \cos\theta \end{pmatrix} \quad (1)$$

wherein the rotation angle θ is determined by:

$$\theta = -\pi - arc\tan(Vs/Us) \quad (2)$$

In this case, the following relationship is established.

$$\begin{pmatrix} Usrot \\ 0 \end{pmatrix} = R \begin{pmatrix} Us \\ Vs \end{pmatrix} \quad (3)$$

The thus determined rotation matrix R is used to execute a coordinate conversion on inputs U and V. Specifically, the coordinate rotating circuit 41 executes a coordinate converting process expressed by Equation 3, on the input signals U and V.

$$\begin{pmatrix} Urot \\ Vrot \end{pmatrix} = R \begin{pmatrix} U \\ V \end{pmatrix} \quad (4)$$

The rotation matrix R is preferably preset on the basis of the specific color to be detected.

The normalizing circuit 42 then uses one of the color difference rotated signals, Urot, and also uses the luminance signal Y as a divisor to execute the following division to obtain a color difference normalized signal Un.

$$Un = Urot/Y \quad (5)$$

At the same time, the tangent circuit 43 determines a tangent signal Tan on the basis of:

$$Tan = Vrot/Urot \quad (6)$$

The subtractor 44 finds the difference between the color difference normalized signal Un and a coefficient K. The absolute value calculating circuit 45 then finds the absolute value of the difference to obtain a color saturation degree-of-deviation signal difS, which can thus be expressed by:

$$difS = abs(Un-K) \quad (7)$$

(where abs(X) denotes an operation of finding the absolute value of X).

The coefficient K denotes Usrot normalized by the specific color luminance Ys. Specifically, the coefficient K can be expressed by:

$$K = Usrot/Ys \quad (8)$$

Similarly, the absolute value calculating circuit 46 finds the absolute value of the tangent signal Tan to obtain a hue deviation signal difH. Specifically, the hue deviation signal difH can be expressed by:

$$difH = abs(Tan) \quad (9)$$

Thus, the coordinate rotating conversion is executed such that the input signals align with the U axis of the UV plane if they correspond to the specific color. A signal is then obtained which indicates how the color saturation and hue deviate from the specific color. In other words, the signal indicates how the color saturation and hue match those of the specific color.

In the description of the example in FIG. 3, the signals are rotated onto the U axis, which corresponds to the specific color and on which V=0. However, the present invention is not limited to this. Similar effects can be exerted by rotating the signals onto the V axis, where U=0.

Moreover, the circuits may use coefficients required to execute coordinate conversion, normalization, and tangent calculation using only integers. For example, an appropriate coefficient A may be used to transform Equations (5) and (8) into:

$$Un = Urot*A/Y \quad (5)'$$

$$K = Usrot*A/Ys \quad (8)'$$

The color saturation deviation signal difS and hue deviation signal difH thus obtained indicate how the color saturation and hue deviate from the specific color pre-specified as a reference. As an example of image processing based on the above result, contour inhibition is carried out.

The maximum value selecting circuit 49 selects the larger value on the basis of:

$$dif = max(\alpha*difS, \beta*difH) \quad (10)$$

(where α and β denote appropriate coefficients, and max (A, B) denotes an operation of selecting the larger one of A and B.)

The maximum value selecting circuit 49 outputs the selection to the lookup table 50 as a deviation signal dif.

Figure 4:
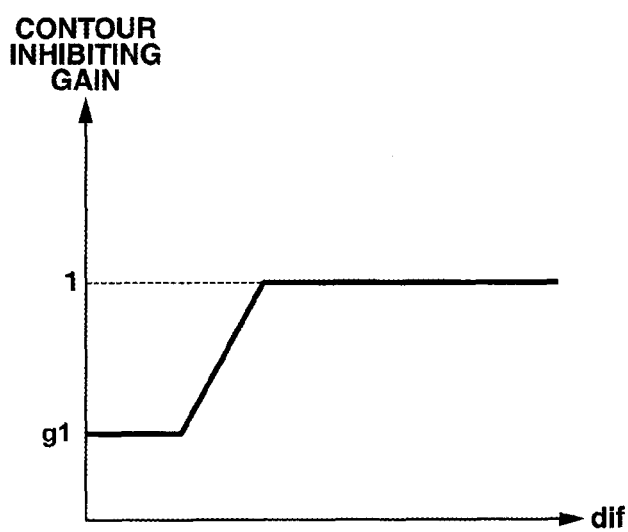
FIG. 4 is a diagram illustrating conversion characteristics based on a lookup table in FIG. 2 according to the embodiment.

FIG. 4 shows an example of characteristics stored in the lookup table 50. When the dif value is between zero (=the pixel has the reference specific color proper) and a first predetermined value, the pixel is very likely to have the specific color. Accordingly, a sufficiently low inhibiting gain G is output.

When the dif value is between the first predetermined value and a second predetermined value, the pixel can have the specific color. The inhibiting gain G is thus output such that, depending on the possibility, it starts from the sufficiently low gain g1 and increases toward 1 consistently with dif value.

When the dif value is equal to or larger than the second predetermined value, there is no possibility that the pixel has the specific color and the fixed gain of 1 is output.

The multiplier 51 multiplies the product of the high frequency component (edge component) of the luminance signal Y, output by the high-pass filter 52, and the appropriate coefficient γ, by the gain thus output by the lookup table 50. The multiplier 51 appropriately attenuates the product and sends the attenuated product to the adder 53 via the selection circuit 55.

The adder 53 adds the product output by the multiplier 51 and original luminance signal Y together, and outputs it, as a luminance signal Y'. In other words, the adder 53 appropriately emphasizes the high frequency component of the luminance signal Y by a contour emphasizing process and outputs it, as a luminance signal Y'.

The resulting luminance signal Y' provides an image for which smoothness increases and contour emphasis lessens with decreasing degree of deviation of the pixel from the specific color, in other words, with increasing similarity between the color of the pixel and the specific color (coincidence is high).

Figure 5:
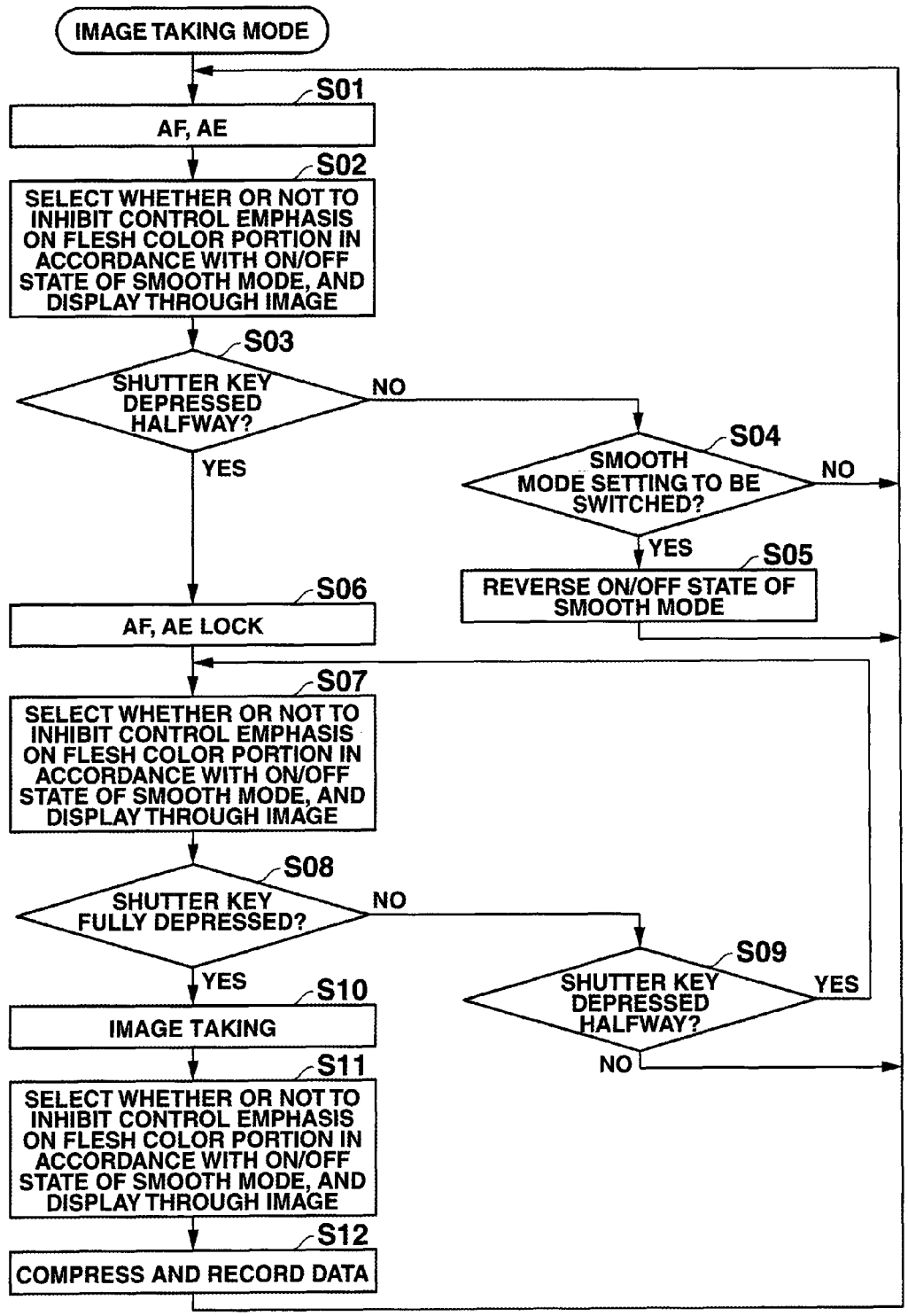
FIG. 5 is a flowchart showing the contents of processing during still image taking according to the embodiment.

Now, with reference to FIG. 5, description will be given of processing executed by the whole digital camera 10 to take a still image in the image taking mode.

Initially, a simple AF and AE processes are executed at most the current predetermined frame rate, for example, at most 15 frames/second. CCD 13 is continuously driven at a shutter speed determined taking the frame rate into account (step S01).

At this time, the specific-color processing section 18*a* in the color process circuit 18 creates a luminance signal Y' on the basis of the color difference signals U and V. Thus, with the smooth mode on, the selection circuit 55 is allowed to select the output from the multiplier 51 to show a through image on the display section 26 on the basis of the image signal Y' UV with the contour emphasis of the flesh color part inhibited. With the smooth mode off, the selection circuit 55 is allowed to select the output from the multiplier 54 to show a through image on the display section 26 on the basis of the image signal Y' UV to which the normal contour emphasis has been applied (step S02).

With the through image displayed in accordance with the on/off state of the smooth mode, the process then consecutively determines whether or not the shutter key of the key input section 27 has been depressed halfway (step S03) and whether or not the smooth mode setting has been instructed to be switched (step SO4). If neither of these conditions are met, the process returns to step S01, described above. With the through image displayed in accordance with the on/off state of the smooth mode, the process is repeated to wait until the shutter key is depressed halfway or the smooth mode setting is instructed to be switched.

When a key operation is performed to instruct the smooth mode setting to be switched, the process determines this at step S04 to reverse the currently set on/off state of the smooth mode, that is, to turn off the smooth mode if it has been on and to turn it on if it has been off (step S05). The process then returns to step S01, described above.

In contrast, when the shutter key is depressed halfway, the process determines this at step S03 to move and lock the focus lens of the image taking optical system 12 so as to focus on the center of the current screen. With the automatic focusing position locked, an appropriate exposure value is obtained, and on the basis of the exposure value, a diaphragm value and a shutter speed are set and locked (step S06).

Then, even with the AF and AE locked, CCD 13 is continuously driven in accordance with the locked contents. The specific-color processing section 18*a* of the color process circuit 18 creates a luminance signal Y' on the basis of the color difference signals U and V as described above. Thus, with the smooth mode on, the display section 26 shows a through image on the basis of the image signal Y' UV with the contour emphasis of the flesh skin portion inhibited. With the smooth mode off, the display section 26 shows a through image on the basis of the image signal Y' UV to which the normal contour emphasis has been applied (step S07).

With the states of AF and AE locked and with a through image displayed in accordance with the on/off state of the smooth mode, the process determines whether or not the shutter key has been fully depressed (step S08) and whether or not the shutter key has still been depressed halfway (step S09). If the full depression operation has not been performed but the halfway depression operation has been maintained, the process returns to step S07, described above.

During the repetition of steps S07 to 09, if the halfway depression operation of the shutter key is cleared, the process determines this at step S09 to judge that actual image taking has not been executed. The process then unlocks AF and AE and then returns again to step S01, described above.

When the shutter key has been fully depressed, the process determines this at step S08 to execute image taking in accordance with the AF and AE values locked in the preceding step S06 (step S10). For image data obtained by image taking, the selection circuit 55 selects the image signal Y' UV corresponding to the output from the multiplier 51 obtained from the specific-color processing section 18*a* if the smooth mode is currently on. The selection circuit 55 selects the image signal Y' UV corresponding to the output from the multiplier 54 if the smooth mode is currently off (step S11). The JPEG circuit 28 compresses the image data and immediately records the compressed data in the memory card 29 (step S12). The process then returns to step S01, described above, to provide for the next image taking.

Thus, in spite of the simple circuit configuration shown in the specific-color processing section 18*a*, by calculating the degree of deviation of the color saturation and hue from the specific color, for example, the flesh color, it is possible to accurately determine how the color saturation and hue of a color constituting the image acquired deviate from the specific color. On the basis of this determination, the appropriate processing can be executed.

In this case, the coordinate rotating circuit 41 of the specific-color processing section 18*a* executes a coordinate rotating conversion based on a rotation matrix using the rotation angle $\theta$ as a coefficient determined by the specific color to be detected. This enables the degree of deviation of the color saturation and hue from the specific color to be more easily determined from the color difference signal resulting from the rotating conversion.

Additionally, the specific-color processing section 18*a* finds the absolute values of both degrees of deviation of the color saturation and hue. This makes it possible to reliably determine how the color saturation or hue deviates from the specific color regardless of sign of the degree of deviation (direction of the deviation).

In the above embodiment, as also shown for the specific-color processing section 18*a* in FIG. 2, the color saturation degree-of-deviation signal difS and hue degree-of-deviation signal difH are determined, and on the basis of these signals, the gain for the contour emphasis of the specific color is calculated and reflected in the luminance signal.

Thus, the gain for the contour emphasis is reduced with increasing similarity to the specific color, for example, the gain for the contour emphasis is reduced if the specific color is the flesh color. This results in a more natural image expression as required, for example, makes the flesh color component of the image appear smoother.

In the description of the above embodiment, the degree of deviation from the flesh color as a specific color is calculated, and on the basis of the calculation, image processing is executed. However, the specific color is not limited to the flesh color. The specific color may be an arbitrary color in a taken image such as the blue of the sky or sea, the green of trees, or the red of the sunset on which a certain image process is to be executed.

In other words, coefficients corresponding to a plurality of specific colors are pre-provided so that one of the coefficients can be selected and supplied to the coordinate rotating circuit 41 in response to the user's instructive operation. This enables the execution of a process for a currently required one of the plurality of specific colors.

Further, a plurality of circuits each corresponding to the specific-color processing section 18a are arranged in parallel and different coefficients for the respective specific colors setting are set for the respective specific-color processing sections. This makes it possible to execute, in parallel, image processes corresponding to a plurality of specific colors in one image signal.

In the description of the above embodiment, the degree of deviation from the specific color is calculated, and as image processing based on the calculation, a contour emphasizing process is executed by manipulating the luminance signal. However, the present invention is not limited to this. A variation in color may be made to appear smoother by executing a band-pass filter process such that, for example, high frequency components containing noise are removed from the color difference signal in accordance with the degree of deviation from the specific color. Moreover, various other image processes may be controlled.

In the description of the above embodiment, the specific-color processing section 18a, shown in FIG. 2, is composed of a hardware circuit. However, the present invention is not limited to this. Software such as an image processing digital signal processor (DSP) constituting at least a part of the color process circuit 18 may execute similar processes in accordance with operation programs stored in the nonvolatile memory.

The above embodiment has been described in conjunction with the application of the present invention to the digital camera. However, the present invention is applicable to a cellular phone or personal digital assistant (PDA) which has camera functions, or to various electronic instruments such as an image viewer which use certain means to acquire existing image data and execute a required image process on the data instead of actually taking image data, or to a function of retouch software.

The present invention is not limited to the above embodiment, and various changes may be made to the embodiment without departing from the spirit of the present invention.

Moreover, the above embodiment includes various levels of inventions. Various inventions can thus be extracted by appropriately combining a plurality of the disclosed components together. For example, at least one of the objects described above can be achieved even if some of the components shown in the embodiment are omitted. If at least one of the effects described above can be exerted, the configuration free from those components can be extracted as an invention.

What is claimed is:

1. An image processing apparatus comprising:
   a degree-of-deviation deriving unit which derives, for each predetermined unit area, a degree of deviation of a color of the unit area from a specific color corresponding to a predetermined characteristic amount of a subject; and
   a correcting unit which corrects the color for each predetermined unit area based on a correction value corresponding to the degree of deviation derived by the degree-of-deviation deriving unit,
   wherein the degree-of-deviation deriving unit comprises:
      a rotational converting unit which executes a coordinate rotating conversion based on a predetermined rotation matrix, on each of two color difference signals in an image signal for a luminance-color difference system;
      a normalizing unit which divides one of the color difference rotated signals obtained by the rotational converting unit by a luminance signal in the image signal to normalize the color difference rotated signal to obtain a color difference normalized signal;
      a color saturation degree-of-deviation calculating unit which calculates a color saturation degree-of-deviation signal from a difference between the color difference normalized signal obtained by the normalizing unit and a predetermined coefficient; and
      a hue degree-of-deviation calculating unit which divides the other of the color difference rotated signals obtained by the rotational converting unit by the one of the color difference rotated signals to calculate a hue degree-of-deviation signal from a resulting quotient.

2. The image processing apparatus according to claim 1, wherein the rotational converting unit executes the coordinate rotating conversion based on the rotation matrix using a coefficient determined by the specific color.

3. The image processing apparatus according to claim 1, wherein at least one of the color saturation degree-of-deviation calculating unit and the hue degree-of-deviation calculating unit outputs an absolute value of the calculation.

4. The image processing apparatus according to claim 1, wherein the correcting unit comprises:
   a gain control unit which uses at least one of the color saturation degree-of-deviation signal and the hue degree-of-deviation signal to output a gain control signal for contour emphasis such that gain decreases consistently with an absolute value of the at least one of the color saturation degree-of-deviation signal and the hue degree-of-deviation signal.

5. The image processing apparatus according to claim 1, wherein the rotational converting unit selects one of a plurality of specific colors to be detected and sets a coefficient corresponding to the selected specific color.

6. The image processing apparatus according to claim 1, wherein a plurality of systems each comprising the rotational converting unit, the normalizing unit, the color saturation degree-of-deviation calculating unit, and the hue degree-of-deviation calculating unit, are arranged in parallel in association with a plurality of specific colors to be detected, and coefficients corresponding to the different specific colors are set for the respective systems.

7. The image processing apparatus according to claim 1, wherein the degree-of-deviation deriving unit derives the degree of deviation of the color of the unit area from the specific color based on two color difference signals in the image signal for the luminance-color difference system.

8. The image processing apparatus according to claim 1, further comprising a selecting unit which selects whether or not the correcting unit corrects a color for each predetermined unit area based on the correction value corresponding to the degree of deviation derived by the degree-of-deviation deriving unit.

9. An imaging apparatus comprising:
   an image taking unit which takes an image of a subject to obtain an image signal for a luminance-color difference system;
   a rotational converting unit which executes a coordinate rotating conversion based on a predetermined rotation matrix, on each of two color difference signals in the image signal obtained by the image taking unit;
   a normalizing unit which divides one of the color difference rotated signals obtained by the rotational converting unit by a luminance signal in the image signal to normalize the color difference rotated signal to obtain a color difference normalized signal;

a color saturation degree-of-deviation calculating unit which calculates a color saturation degree-of-deviation signal from a difference between the color difference normalized signal obtained by the normalizing unit and a predetermined coefficient;

a hue degree-of-deviation calculating unit which divides the other of the color difference rotated signals obtained by the rotational converting unit by the one of the color difference rotated signals to calculate a hue degree-of-deviation signal from a resulting quotient;

an image processing unit which executes image processing on the image signal using at least one of the color saturation degree-of-deviation signal and hue degree-of-deviation signal; and a recording unit which records an image signal obtained by the image processing unit.

10. An image processing method comprising:

a rotational converting step of executing a coordinate rotating conversion based on a predetermined rotation matrix, on each of two color difference signals in an image signal for a luminance-color difference system;

a normalizing step of dividing one of the color difference rotated signals obtained in the rotational converting step by a luminance signal in the image signal to normalize the color difference rotated signal to obtain a color difference normalized signal;

a color saturation degree-of-deviation calculating step of calculating a color saturation degree-of-deviation signal from a difference between the color difference normalized signal obtained in the normalizing step and a predetermined coefficient; and a hue degree-of-deviation calculating step of dividing the other of the color difference rotated signals obtained in the rotational converting step by the one of the color difference rotated signals to calculate a hue degree-of-deviation signal from a resulting quotient.

11. The image processing method according to claim 10, wherein the rotational converting step executes the coordinate rotating conversion based on the rotation matrix using a coefficient determined by the specific color.

12. The image processing method according to claim 11, wherein at least one of the color saturation degree-of-deviation calculating step and the hue degree-of-deviation calculating step outputs an absolute value of the calculation.

13. The image processing method according to claim 10, further comprising a gain control step of using at least one of the color saturation degree-of-deviation signal and the hue degree-of-deviation signal to output a gain control signal for contour emphasis such that gain decreases consistently with an absolute value of the at least one of the color saturation degree-of-deviation signal and the hue degree-of-deviation signal.

14. The image processing method according to claim 11, wherein the rotational converting step selects one of a plurality of specific colors to be detected and sets a coefficient corresponding to the selected specific color.

15. The image processing method according to claim 11, wherein a plurality of systems which each perform the rotational converting step, the normalizing step, the color saturation degree-of-deviation calculating step, and the hue degree-of-deviation calculating step, are arranged in parallel in association with a plurality of specific colors to be detected, and coefficients corresponding to the different specific colors are set for the respective systems.

16. A non-volatile computer-readable recording medium having stored thereon a program which is executable by a computer to perform processes comprising:

a rotational converting step of executing a coordinate rotating conversion based on a predetermined rotation matrix, on each of two color difference signals in an image signal for a luminance-color difference system;

a normalizing step of dividing one of the color difference rotated signals obtained in the rotational converting step by a luminance signal in the image signal to normalize the color difference rotated signal to obtain a color difference normalized signal;

a color saturation degree-of-deviation calculating step of calculating a color saturation degree-of-deviation signal from a difference between the color difference normalized signal obtained in the normalizing step and a predetermined coefficient; and a hue degree-of-deviation calculating step of dividing the other of the color difference rotated signals obtained in the rotational converting step by the one of the color difference rotated signals to calculate a hue degree-of-deviation signal from a resulting quotient.

17. The computer-readable recording medium according to claim 16, wherein the rotational converting step executes the coordinate rotating conversion based on the rotation matrix using a coefficient determined by the specific color.

18. The program computer-readable recording medium according to claim 16, wherein at least one of the color saturation degree-of-deviation calculating step and the hue degree-of-deviation calculating step outputs an absolute value of the calculation.

19. The computer-readable recording medium according to claim 16, further comprising a gain control step of using at least one of the color saturation degree-of-deviation signal and the hue degree-of-deviation signal to output a gain control signal for contour emphasis such that gain decreases consistently with an absolute value of the at least one of the color saturation degree-of-deviation signal and the hue degree-of-deviation signal.

* * * * *